(12) United States Patent
Adler et al.

(10) Patent No.: US 10,495,070 B2
(45) Date of Patent: Dec. 3, 2019

(54) GEARBOX FOR A WIND TURBINE

(71) Applicant: Nordex Energy GmbH, Hamburg (DE)

(72) Inventors: Florian Adler, Hamburg (DE); Moritz Dreher, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 96 days.

(21) Appl. No.: 15/906,982

(22) Filed: Feb. 27, 2018

(65) Prior Publication Data

US 2018/0245571 A1    Aug. 30, 2018

(30) Foreign Application Priority Data

Feb. 28, 2017    (EP) ..................... 17158374

(51) Int. Cl.
| | |
|---|---|
| *F03D 80/70* | (2016.01) |
| *F16H 57/021* | (2012.01) |
| *F16H 1/20* | (2006.01) |
| *F15B 15/14* | (2006.01) |
| *F16C 19/38* | (2006.01) |
| *F16C 23/06* | (2006.01) |
| *F03D 15/00* | (2016.01) |
| *F16C 19/54* | (2006.01) |
| *F16C 25/06* | (2006.01) |
| *F03D 1/00* | (2006.01) |
| *F16H 1/28* | (2006.01) |
| *F16H 57/04* | (2010.01) |

(52) U.S. Cl.
CPC ............ *F03D 80/70* (2016.05); *F03D 15/00* (2016.05); *F15B 15/1428* (2013.01); *F15B 15/1457* (2013.01); *F16C 19/38* (2013.01); *F16C 19/54* (2013.01); *F16C 23/06* (2013.01); *F16C 25/06* (2013.01); *F16H 1/20* (2013.01); *F16H 57/021* (2013.01); *F03D 1/00* (2013.01); *F05B 2240/54* (2013.01); *F05B 2260/4031* (2013.01); *F05B 2260/98* (2013.01); *F05B 2270/331* (2013.01); *F05B 2270/604* (2013.01); *F16C 2360/31* (2013.01); *F16C 2361/61* (2013.01); *F16H 1/28* (2013.01); *F16H 57/0495* (2013.01); *Y02E 10/722* (2013.01)

(58) Field of Classification Search
None
See application file for complete search history.

(56) References Cited

U.S. PATENT DOCUMENTS 7,572,061 B2    8/2009  Fox et al.
7,771,127 B2 *  8/2010  Smook ............... F16C 35/067
                                                    384/571

FOREIGN PATENT DOCUMENTS

DE    102006029151 A1    3/2007
DE    102008024049 A1    11/2009

* cited by examiner

*Primary Examiner* — Dirk Wright
(74) *Attorney, Agent, or Firm* — Walter Ottesen, P.A.

(57) ABSTRACT

A gearbox for a wind turbine, which has at least one first and one second shaft, which are arranged parallel to each other and supported in roller bearings. A preload device for the roller bearings is provided, wherein the preload device generates a preload force between the first and the second shaft and is supported with one end on the shafts in each case.

11 Claims, 4 Drawing Sheets

GEARBOX FOR A WIND TURBINE

CROSS REFERENCE TO RELATED APPLICATION

This application claims priority of European patent application no. 17 158 374.3, filed Feb. 28, 2017, the entire content of which is incorporated herein by reference.

FIELD OF THE INVENTION

The present invention relates to a gearbox for a wind turbine, in particular a main gearbox of a wind turbine.

BACKGROUND OF THE INVENTION

In the case of wind turbines, operating states may occur in which they are operated at a high rotational speed and with a low electrical/mechanical loading. Such a situation occurs, for example, if the wind turbine is operated without a counteracting generator torque. In this case, in particular, a roller bearing system in a fast-running spur gear stage of the gearbox may sustain damage. If a minimum loading of the roller bearing is not attained, there is the risk that the rolling elements present in the bearings of the gear shafts no longer roll between the bearing rings, but slide over the rolling surfaces. If the generator torque is rapidly reactivated, the rolling elements are accelerated abruptly to rolling speed. The increasing contact pressure in the bearing causes the lubricant film to fail, and the bearing is damaged.

A bearing arrangement for supporting a shaft in a receiving structure has become known from DE 10 2008 024 049. A preload bearing, which is connected to the fixed receiving structure via a tensile member, is arranged on the shaft. A radial preload is introduced into the shaft via the tensile member.

An arrangement for a roller bearing having a controlled bearing loading is known from DE 10 2006 029 151 A1. Provided in addition to the actual roller bearing there is an ancillary bearing system, by which it is ensured that a minimum loading of the bearing is exceeded.

SUMMARY OF THE INVENTION

It is an object of the invention to provide a gearbox for a wind turbine, which, with the simplest possible means, avoids damage to its roller bearings resulting from non-attainment of the minimum loading of the latter.

The object is achieved according to the invention by a gearbox for a wind turbine. The gearbox includes: at least four roller bearings including a first roller bearing, a second roller bearing, a third roller bearing and a fourth roller bearing; a first shaft supported by the first roller bearing and the second roller bearing; a second shaft arranged parallel to the first shaft and supported by the third roller bearing and the fourth roller bearing; a preload device for the four roller bearings; the preload device having a first end and a second end; the preload device being configured to generate a preload force between the first shaft and the second shaft; and, the preload device being supported on the first shaft via the first end and supported on the second shaft via the second end.

The gearbox according to the invention is provided and intended for use in a wind turbine. Preferably, planetary gearboxes are used in wind turbines. The gearbox according to the invention has a first and a second shaft, which are arranged parallel to each other. The first and the second shaft are supported in roller bearings. The gearbox has a preload means that, for the first shaft and the second shaft, introduces a radially directed preload force into the shafts. According to the invention, the preload means is arranged with one end on a shaft in each case, and acts between the first and the second shaft. In comparison with a known preload means from the prior art, the preload means according to the invention acts between two shafts, and braces them radially against each other. It is thereby ensured, for the roller bearing systems of both shafts, that a minimum load is exceeded.

In a preferred embodiment, the preload means is equipped with at least one hydraulic unit. As a result of actuation of the hydraulic unit, a desired radial preload force can be applied to both shafts. The preload means can be switched and controlled by closed-loop control. Unlike preload means that have a constant-action preload force, the hydraulic unit offers the possibility of optionally activating or deactivating the preload means, or setting the level of the preload force. For reasons of operational reliability, a hydraulic fluid that is compatible with a lubricant used in the gearbox is preferably applied to the hydraulic unit. Preferably, the hydraulic fluid is identical with the lubricant. In the case of a corresponding configuration, no additional hydraulic pump is required. The transmission-oil primary-flow pump, which is present in any case, can provide the hydraulic unit with pressure, if necessary with the aid of a hydraulic pressure intensifier or pressure booster.

In one embodiment, the preload means is supported on both shafts, by means of at least one roller and/or sliding bearing in each case. A bearing is in each case mounted on the first and the second shaft. The two bearings are in alignment in the radial direction of the shafts. A support ring, having a receiver, is in each case arranged on the outer ring of the bearings. The hydraulic unit comprises a hydraulic piston and a hydraulic cylinder, which are each connected to a push rod. The free end of the push rods is mounted in the receiver of respectively one of the two support rings.

In one embodiment, the bearing system of the first and the second shaft in each case has a floating bearing, wherein the preload means is mounted close to the floating bearings between the shafts. The problem of damage to the roller bearing resulting from non-attainment of a minimum loading occurs, in particular, if cylindrical roller bearings are used as floating bearings. As a result of the preload means being mounted close to the floating bearing or floating bearings, the preload means acts directly on the spatially adjacent floating bearing. However, the preload means may also be mounted close to the fixed bearing if tensioning of the bearing is required here.

In a preferred further embodiment, the preload means acts between a rapidly rotating output shaft and an intermediate shaft of the gearbox. The intermediate shaft may be a slow-running intermediate shaft, or a medium-speed intermediate shaft, in particular in the case of a three-stage planetary gearbox.

In a more preferred embodiment, the preload means is equipped with a preload spring. The preload spring in this case is configured to effect a radial preloading between the two shafts. When pressure is applied to the hydraulic cylinder, the preload force is eliminated. In the case of the configuration according to the invention, a hydraulic pressure is applied to the hydraulic cylinder when the gearbox is reliably loaded beyond a minimum loading. If there is a risk of under-loading, pressure is not applied to the hydraulic cylinder, and the preload spring braces the two shafts that carry the preload means against each other. This configuration represents a so-called failsafe solution, since it is ensured, even in the event of failure of the hydraulic unit, that there is a minimum loading on the bearings.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
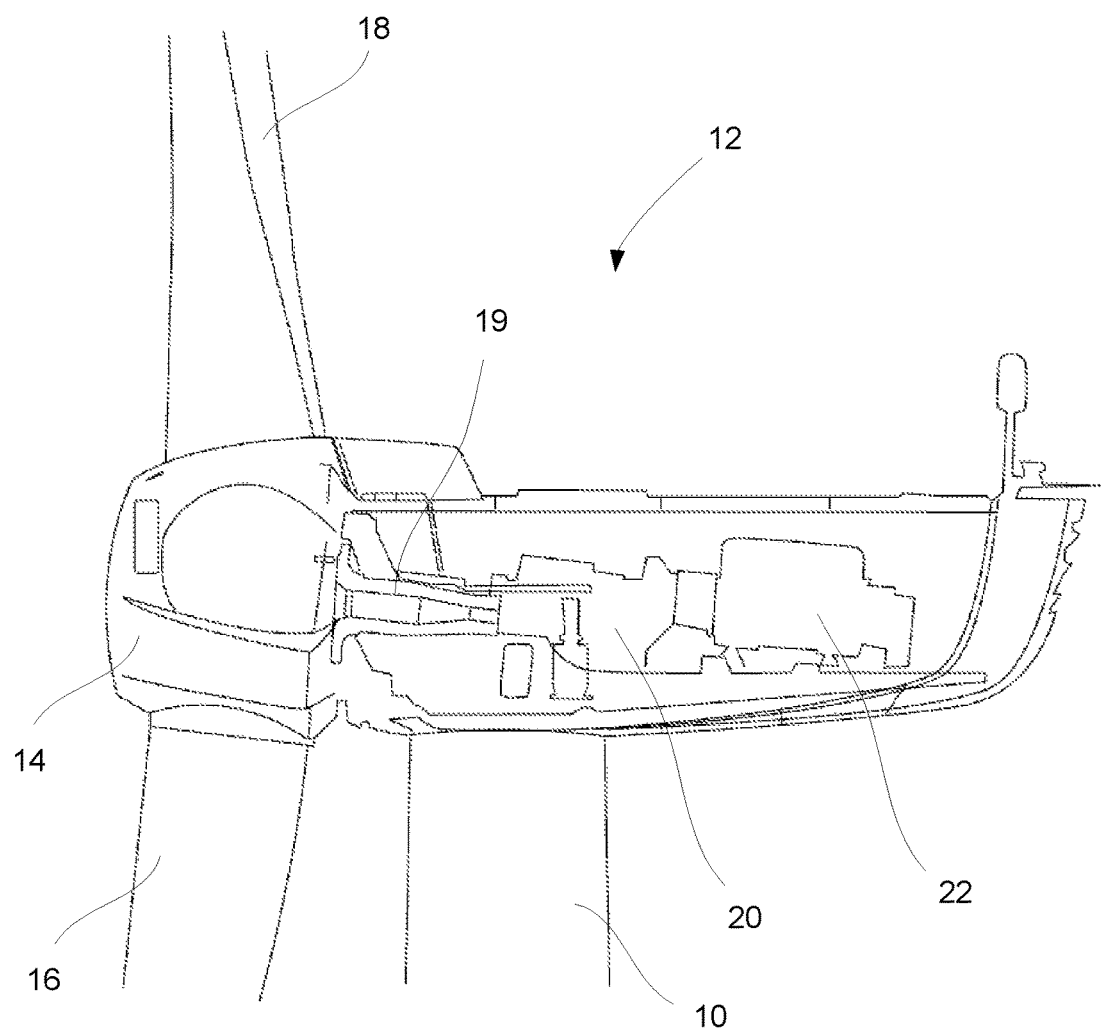
FIG. 1 shows a portion of a wind turbine, with a schematic view from the interior of the nacelle.

Shown in FIG. 1, in a schematic detail view, is the head end of the tower 10 of a wind turbine. Mounted on the tower 10 is a nacelle 12, which carries the mechanical drive train and a generator. The nacelle 12 is usually mounted so as to be rotatable about a longitudinal axis of the tower. The nacelle 12 additionally carries a rotor 14, which is rotatably mounted. The rotor 14 comprises a hub, and rotor blades, of which the rotor blades 16 and 18 can be seen in the side view of FIG. 1. When the wind turbine is in normal operation, the wind imparts to the rotor 14, via the rotor blades 16, 18, a mechanical torque that is applied, via a rotor shaft 19 and a gearbox 20, to a generator 22. The generator 22 generates a corresponding counter-torque for the drive train, such that the latter is in equilibrium and can rotate at a constant rotational speed.

When a wind turbine is in operation, for various reasons the situation may occasionally occur that the wind turbine is operated at a relatively high rotational speed and with low electrical/mechanical loading. In this case, no torque, or only a slight torque, is transmitted via the gearbox. In this situation, there is the risk that the rolling elements present in the bearings of the gear shafts do not roll between the bearing rings, but instead, in part without lubrication, slide over the rolling surfaces and damage the latter.

Figure 2:
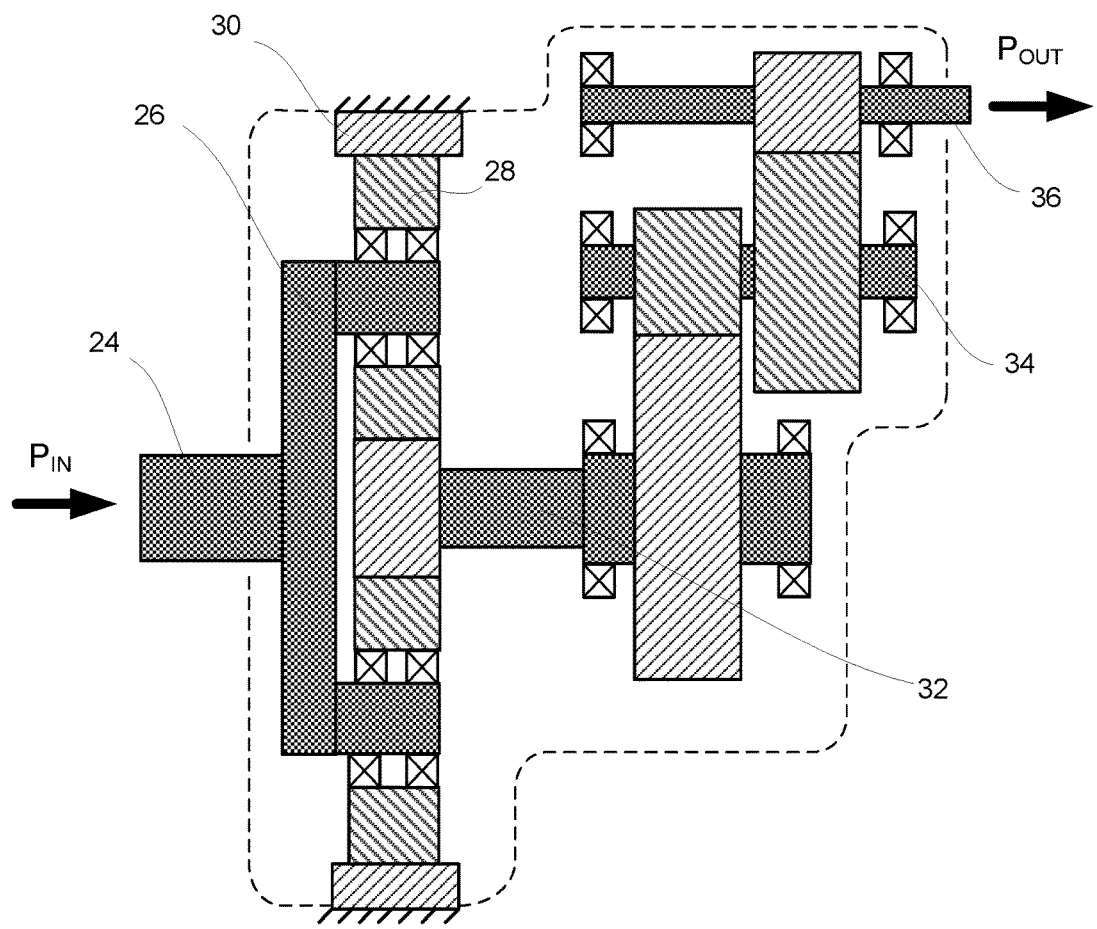
FIG. 2 shows a schematic view of a planetary gearbox that may be used in a wind turbine.

FIG. 2 shows a schematic view of a three-stage planetary gearbox. An input quantity to be transmitted is applied, as an input power PIN, to the slow-running shaft 24, which is connected to the planet carrier 26. The planet carrier 26 has planetary gears 28, which rotate in an internal ring gear 30 and drive a slowly rotating intermediate shaft 32. Via the slowly rotating intermediate shaft 32, the power is transmitted to the fast-running intermediate shaft 34, from where it is transmitted to the fast-running output shaft 36. The mechanical output power POUT can be extracted at the fast-running output shaft 36. The problem on which the invention is based, consisting in the minimum load of the roller bearings not being attained, occurs in particular between the fast-running output shaft 36 and the fast-running intermediate shaft 34.

Figure 3:
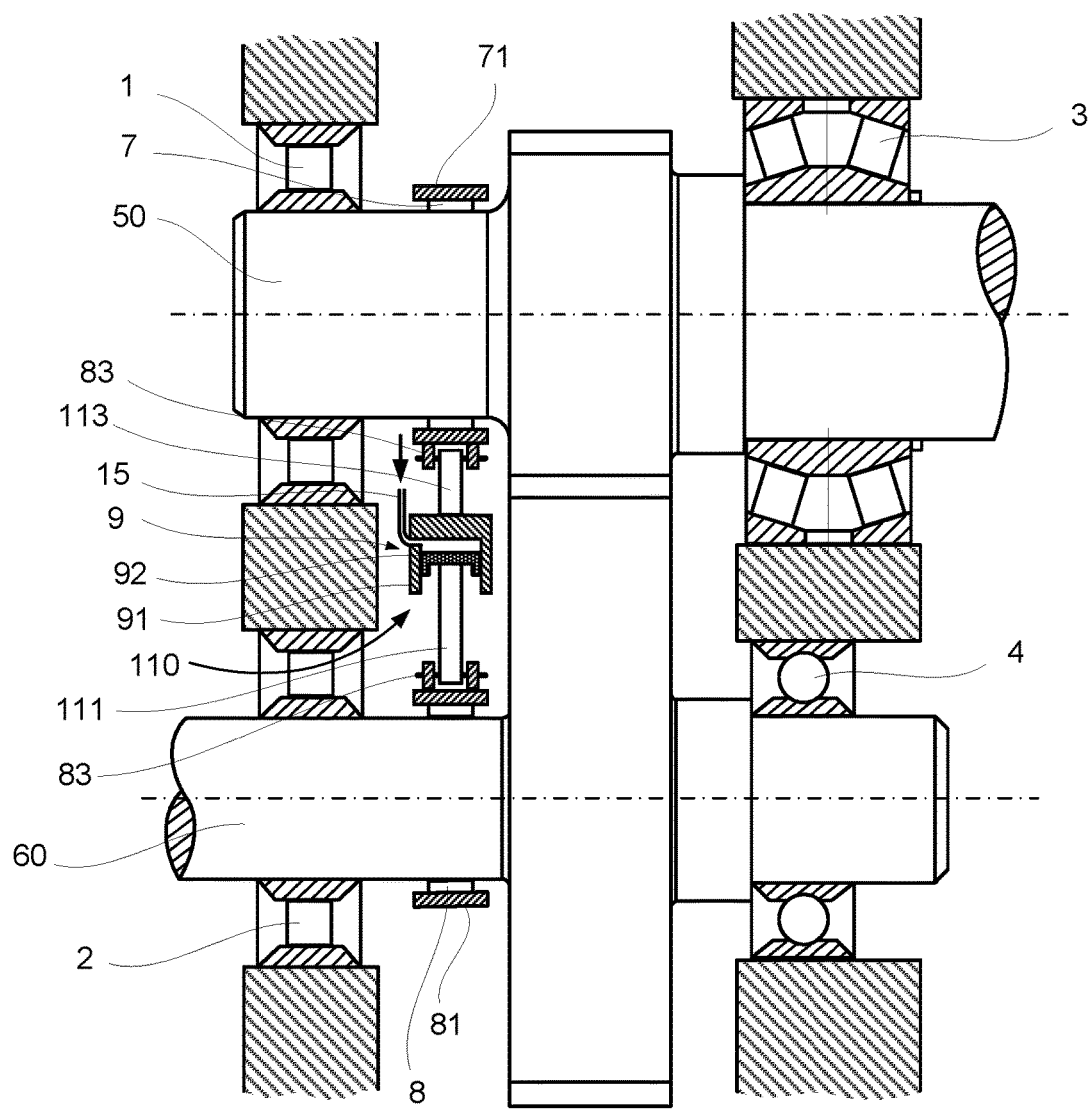
FIG. 3 shows a detail view of the gearbox with the preload means according to the invention; and, FIG. 4 shows a detail view of the gearbox with a further configuration of a spring-preloaded preload means.

FIG. 3 shows a detail view here, the fast-running output shaft 50 being supported and preloaded in relation to the fast-running intermediate shaft 60. The fast-running output shaft 50 is supported by a double-row roller bearing 31 and a cylindrical roller bearing 1. The fast-running intermediate shaft 60 is supported by a single-row ball bearing 4 and a cylindrical roller bearing 2.

Arranged between the shafts 50 and 60 is a preload means 110. The preload means 110 is connected to a sliding bearing 7 arranged on the shaft 50, and to a sliding bearing 8 arranged on the intermediate shaft 60. The two sliding bearings 7 and 8 each have a support ring 71, 81, having a receiver 83. The hydraulic unit 9 is located between the support rings 71 and 81. The hydraulic cylinder 91 and the hydraulic piston 92 are provided with push rods 111 and 113. The push rods 111 and 113 are mounted in the receivers of the support rings 71 and 81 by means of appropriate connecting means. A hydraulic fluid is supplied to the hydraulic cylinder 91 via a feed line 15. As a result, the hydraulic piston 92 moves out of the hydraulic cylinder 91, and the push rods 111 and 113 force the shafts 50 and 60 apart in the radial direction. As a result, a radial preload is built up between the shafts 50 and 60.

In the case of the preload means according to the invention represented in FIG. 3, pressure must be applied to the hydraulic unit 9 in order to effect a preloading between the shafts 50 and 60.

Figure 4:
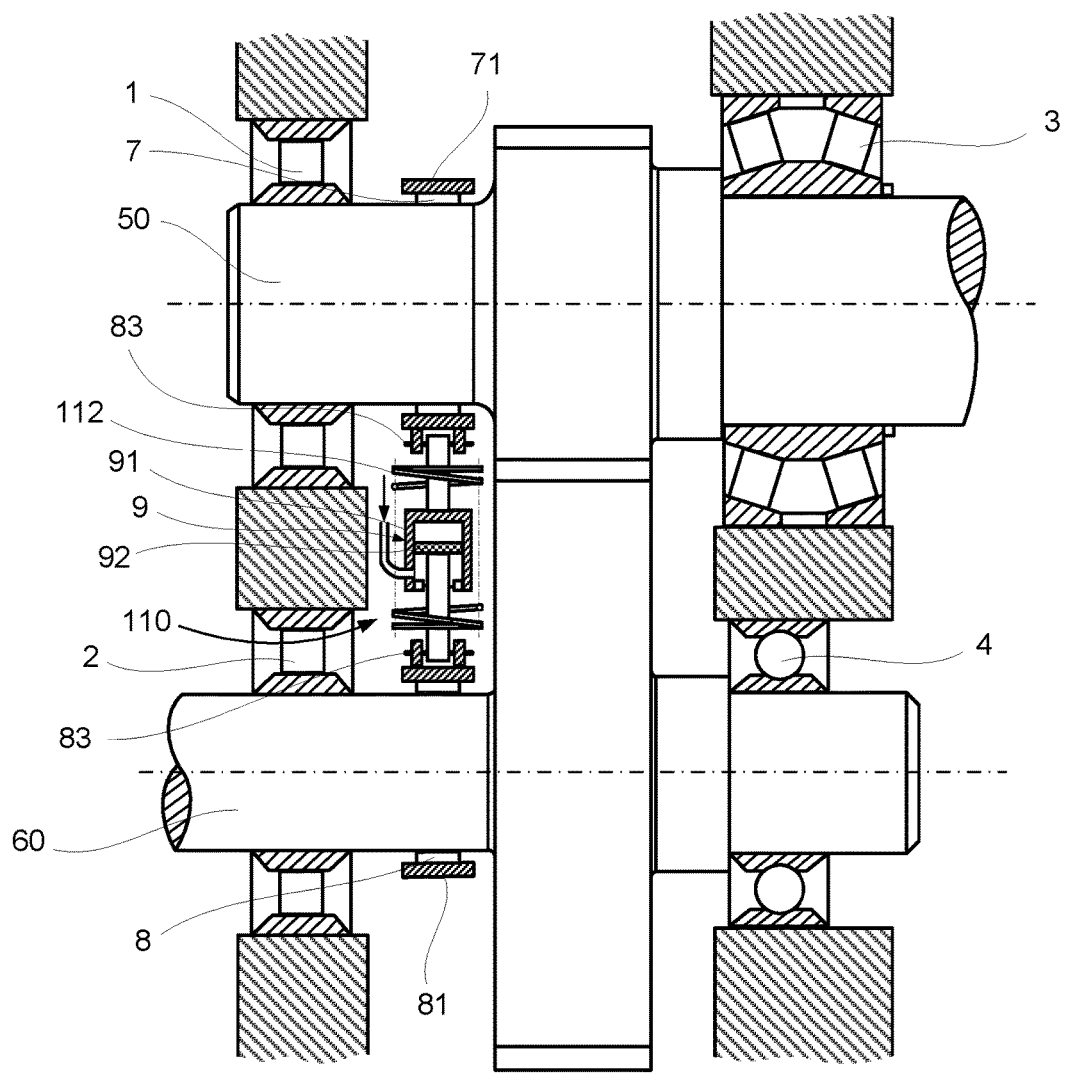

FIG. 4 shows an alternative embodiment of the preload means according to the invention, in which the functioning of the hydraulic unit 9 is reversed. By means of a preload spring 112, the preload means between the shafts 50 and 60 is provided with a radial preload force. If pressure is applied to the hydraulic unit 9, the hydraulic piston 92 moves into the hydraulic cylinder 91 and eliminates the preload force of the preload spring 112. The tensioning in the radial direction between the shafts 50 and 60 is eliminated.

The embodiment according to FIG. 4 is a so-called failsafe variant, in which it is ensured that, in the event of failure of the hydraulic unit 9, there is always a minimum load on the bearings. The hydraulic unit 9 must thus work in order that no radially acting preload force acts upon the shafts. In contrast to this, in the case of the configuration according to FIG. 3 the preload force is only generated when force is applied to the hydraulic unit.

It is understood that the foregoing description is that of the preferred embodiments of the invention and that various changes and modifications may be made thereto without departing from the spirit and scope of the invention as defined in the appended claims.

LIST OF REFERENCES 1 cylindrical roller bearing
2 cylindrical roller bearing
4 ball bearing
7 sliding bearing
8 sliding bearing
9 hydraulic unit
10 tower
12 nacelle
13 push rod
14 rotor
15 feed line
16 rotor blade
18 rotor blade
19 rotor shaft
20 gearbox
22 generator
24 slow-running shaft
26 planet carrier
28 planetary gears
30 internal ring gear
31 double-row roller bearing
32 slow-running intermediate shaft
34 fast-running intermediate shaft
36 fast-running output shaft 50 fast-running output shaft
60 fast-running intermediate shaft
71 support ring
81 support ring
83 receiver
91 hydraulic cylinder
92 hydraulic piston
110 preload means
111 push rod
112 preload spring
113 push rod

What is claimed is:

1. A gearbox for a wind turbine, the gearbox comprising:
at least four roller bearings including a first roller bearing, a second roller bearing, a third roller bearing and a fourth roller bearing;
a first shaft supported by said first roller bearing and said second roller bearing;
a second shaft arranged parallel to said first shaft and supported by said third roller bearing and said fourth roller bearing;
a preload device for said four roller bearings; said preload device having a first end and a second end;
said preload device being configured to generate a preload force between said first shaft and said second shaft; and,
said preload device being supported on said first shaft via said first end and supported on said second shaft via said second end.

2. The gearbox of claim 1, wherein said preload device includes at least one hydraulic unit.

3. The gearbox of claim 2 further comprising:
a lubricant applied in said gearbox;
said hydraulic unit being configured to, optionally, have a hydraulic fluid applied thereto; and,
said hydraulic fluid being compatible with said lubricant applied in said gearbox.

4. The gearbox of claim 3, wherein said hydraulic fluid is identical to said lubricant.

5. The gearbox of claim 1 further comprising:
a first further bearing;
a second further bearing;
said first further bearing being a roller bearing or a sliding bearing;
said second further bearing being a roller bearing or a sliding bearing; and,
said preload device being supported on said first shaft via said first further bearing and on said second shaft via said second further bearing.

6. The gearbox of claim 5 further comprising:
a first support ring provided with a first receiver and connected to said first further bearing; and,
a second support ring provided with a second receiver and connected to said second further bearing.

7. The gearbox of claim 2 further comprising:
a first push rod;
a second push rod;
said hydraulic unit having a hydraulic cylinder and a hydraulic piston;
said hydraulic cylinder being connected to said first push rod; and,
said hydraulic piston being connected to said second push rod.

8. The gearbox of claim 2 further comprising:
a push rod;
said hydraulic unit having a hydraulic cylinder and a hydraulic piston; and,
at least one of said hydraulic cylinder and said hydraulic piston being connected to said push rod.

9. The gearbox of claim 1, wherein:
said first roller bearing and said third roller bearing are configured as floating bearings; and,
said preload device is mounted between said first shaft and said second shaft near said floating bearings.

10. The gearbox of claim 1, wherein:
said first shaft is an output shaft configured to rotate rapidly;
said second shaft is an intermediate shaft; and,
said preload device acts between said output shaft and said intermediate shaft.

11. The gearbox of claim 2, wherein:
said preload device has a preload spring; and,
said at least one hydraulic unit is configured, when actuated, to remove a preloading of said preload spring.

* * * * *